(12) United States Patent
Denny

(10) Patent No.: US 8,297,346 B2
(45) Date of Patent: Oct. 30, 2012

(54) LOAD BEARING ASSEMBLY

(75) Inventor: Mark Joseph Denny, Wareham (GB)

(73) Assignee: BP Exploration Operating Company Limited, Middlesex (GB)

( * ) Notice: Subject to any disclaimer, the term of this patent is extended or adjusted under 35 U.S.C. 154(b) by 0 days.

(21) Appl. No.: 12/737,574

(22) PCT Filed: Jul. 17, 2009

(86) PCT No.: PCT/GB2009/001763
§ 371 (c)(1),
(2), (4) Date: Jan. 27, 2011

(87) PCT Pub. No.: WO2010/012979
PCT Pub. Date: Feb. 4, 2010

(65) Prior Publication Data
US 2011/0120696 A1    May 26, 2011

(30) Foreign Application Priority Data

Jul. 28, 2008 (EP) .................................. 08252555

(51) Int. Cl.
*E21B 33/04* (2006.01)
(52) U.S. Cl. .................. 166/65.1; 166/75.14; 166/89.2; 166/382
(58) Field of Classification Search .................. 166/54.1, 166/65.1, 67, 68.5, 75.14, 89.2, 382
See application file for complete search history.

(56) References Cited

U.S. PATENT DOCUMENTS

| | | |
|---|---|---|
| 3,424,485 A | 1/1969 | Arutunoff |
| 4,913,239 A | 4/1990 | Bayh, III |
| 5,297,943 A | 3/1994 | Martin |
| 5,670,747 A | 9/1997 | Lawer et al. |
| 5,732,771 A | 3/1998 | Moore |
| 6,089,832 A | 7/2000 | Patterson |
| 6,202,743 B1 * | 3/2001 | Moore .................. 166/65.1 |

(Continued)

FOREIGN PATENT DOCUMENTS

CA    2 222 321    6/1998

(Continued)

OTHER PUBLICATIONS

Form PCT/IB/326, Notification Concerning Transmittal of International Preliminary Report on Patentability; International Application No. PCT/GB2009/001763, filed Jul. 17, 2009 (10 pgs).

(Continued)

*Primary Examiner* — Brad Harcourt
(74) *Attorney, Agent, or Firm* — Nixon & Vanderhye (57) ABSTRACT

Load bearing assembly for suspending a load from a wellhead assembly, having a connector for suspending jointed production tubing therefrom and a fluid-to-air connector seals around an electrical conductor extending therethrough. The assembly has a jointed production tubing section with a first connector for connecting the tubing to the wellhead assembly connector. The assembly has a second connector for connecting the jointed production tubing section to a load bearing part of an electrical conduction section of the assembly. The load bearing part suspends the weight of the electrical conduction section and a load in a well from the second connector. The electrical conduction section includes an electrical conductor part for supplying electrical power to the load. The electrical conductor part is connected to an electrical cable which extends outside and along the jointed production tubing section away from the second connector and towards the well head in use.

18 Claims, 4 Drawing Sheets

U.S. PATENT DOCUMENTS

| | | | |
|---|---|---|---|
| 6,530,433 B2 * | 3/2003 | Smith et al. | 166/387 |
| 2003/0136556 A1 | 7/2003 | Cornelssen et al. | |
| 2003/0196792 A1 | 10/2003 | Riddell et al. | |
| 2006/0086508 A1 * | 4/2006 | Coon et al. | 166/380 |
| 2009/0183870 A1 * | 7/2009 | Leitch | 166/244.1 |

FOREIGN PATENT DOCUMENTS

| | | |
|---|---|---|
| WO | WO 97/38467 | 10/1997 |
| WO | WO 97/39506 | 10/1997 |

OTHER PUBLICATIONS

International Search Report for PCT/GB2009/001763, mailed Sep. 2, 2009.

Written Opinion of the International Searching Authority for PCT/GB2009/001763, mailed Sep. 2, 2009.

* cited by examiner

Fig. 4

LOAD BEARING ASSEMBLY

This application is the U.S. national phase of International Application No. PCT/GB2009/001763, filed 17 Jul. 2009, which designated the U.S., and claims priority to EP Application No. 08252555.1, filed 28 Jul. 2008, the entire contents of each of which are hereby incorporated by reference.

This invention relates to a load bearing assembly for suspending a load in a well, and particularly to an assembly for suspending a load from an electro-mechanical cable or a tubing-encapsulated power cable. An electro-mechanical cable is a cable which can conduct electricity as well as support a load and its own weight. Typically, electro-mechanical cables comprise an electrically conductive core surrounded by a spiral wound outer sheath capable of supporting both the weight of the cable (core and sheath) and a load supported at the lower end of the cable. Tubing-encapsulated power cable includes coiled tubing in which a separate power cable extends through a length of spoolable tubing and tubing in which an electrical core has a tube bonded around it.

BACKGROUND OF THE INVENTION

Figure 1:
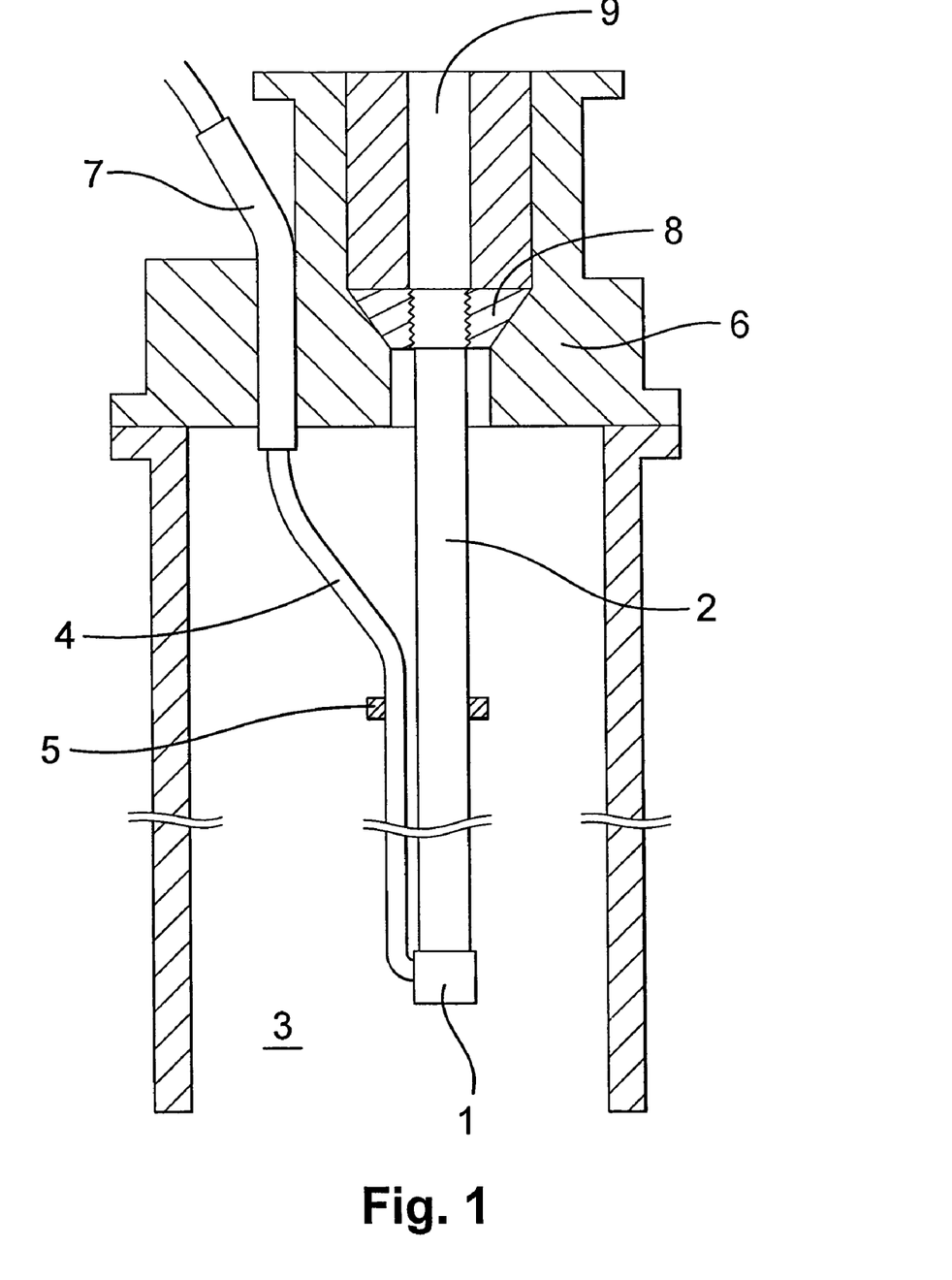
FIG. 1 is a schematic diagram of a conventional pumping assembly in a well.

In the oil and gas production industry, pieces of equipment are often required to be suspended in a well. For example, a pump assembly (comprising a down hole pump and a motor) may be needed in a well to assist in lifting fluids from the bottom of the well to the surface. The main components of a typical arrangement are shown in FIG. 1. According to conventional practise, the pump assembly (1) is attached to the lower end of a jointed tubing string (2) so that the jointed tubing holds the pump assembly in position in the well (3). The jointed tubing string is normally the production tubing string and comprises a series of rigid tubing sections joined together. To supply power to the pump assembly, an electrical cable (4) is run along the outside of the jointed production tubing string and clamped thereto using cast iron clamps or tensioned steel bands (5) so that the production tubing string supports the weight of the electrical cable. The lower end of the electrical cable is connected to the pump assembly.

The production tubing string (2) is suspended from a well head (6) by way of a connector (8) so that fluids can flow from the bottom of the well, up the production tubing and through a channel (9) in the well head. The well head is the assembly at the top of the well casing that seals the top of the annulus between the well casing and the production tubing. The connector (8) has a conical outer profile and a threaded inner bore. The top of the production tubing string is also provided with threads so that it can be screwed into the connector (8). The connector sits in a conical seat so as to hang the production tubing string in the well casing.

A Christmas tree (not shown in FIG. 1) connected to the top of the well head includes an arrangement of valves for directing fluids to/from the well and for sealing off the well when desired.

The electrical cable (4) is separated from the jointed production tubing string (2) just below the well head (6) and run through a separate fluid to air connector (7). The fluid to air connector allows electrical cables to pass from the well to the external environment whilst preventing the flow of fluids between the well and the external environment.

Several types of fluid to air connector have been used in the industry. For example, the fluid to air connector can be in the form of a rubber seal which can be arranged annularly around the electrical cable and which can be compressed so as to seal around the cable.

However, for reliability, the fluid to air connector (7) is typically a penetrator. Penetrators are well known in the oil and gas production industry and often comprise a steel cylinder through which the electrical cable runs, the space between the inner wall of the cylinder and the cable being sealed with epoxy resin, elastomer packings or similar. The steel cylinder has a smooth outer surface around which a seal can be formed easily, or alternatively recesses for o-rings which seal in a smooth bore provided in the well head. Such penetrators are widely available, for example from Remote Marine Systems, ITT Cannon, Teledyne D. G. O'Brien, Quick Connectors Inc, or Diamould.

As failure of the fluid to air connector (7) would compromise the ability of the well head to contain well pressure, it is a safety critical component. Consequently, in typical arrangements, penetrators are used which have been manufactured with a portion of electrical cable extending there-through. The seal is then tested in the factory. The lower end of the electrical cable extending through the penetrator is then spliced onto the upper end of the pump assembly's electrical cable in situ. In this way, a reliable seal through the fluid to air connector is obtained.

This conventional arrangement of a fluid to air connector (7) which is separate from the channel (9) passing through the well head for the flow of well fluids is widely used as the presence of the electrical power cable does not interfere with the operation of the Christmas tree valves, so the valves can be readily closed to seal off the well if necessary.

Conventional methods of installing pump assemblies on jointed production tubing in wells requires the use of expensive workover rigs to remove and re-install the production tubing when maintenance or repair of the pump assembly is required. This process is also time consuming.

U.S. Pat. No. 5,670,747 discloses an apparatus for installing an electric submersible pump within an oil well. In U.S. Pat. No. 5,670,747, production tubing extends from the wellhead to the electric submersible pump, i.e. the electric submersible pump is suspended from the wellhead by the production tubing. In use, pumped fluids travel from the pump to the wellhead within the production tubing. One or more packers are located at a plurality of depths within the well to seal the annulus between the production tubing and the well casing. Electrical power is transmitted to the electric submersible pump via a series comprising a wellhead penetrator, an electric submersible pump (ESP) cable, a packer penetrator and a motor lead extension. The ESP cable and the motor lead extension are attached to the outside of the production tubing. The cable and the motor lead extension comprises a substantially rigid outer metal jacket whose principal function is to provide abrasion resistance and some mechanical protection to the electrical core of the cable. However, the substantially rigid outer metal jacket is not intended to support an applied axial load, nor is it capable of so doing. Indeed, rather than the cable supporting the weight of the pump assembly, the pump assembly and the cable along its entire length are supported by the production tubing.

Alternative methods of installing pump assemblies have been proposed to avoid the expense and time involved with installing pump assemblies on jointed tubing. Such methods include installing the pump assembly on the end of spoolable tubing or on the end of an electro-mechanical cable. Where spoolable tubing is used, the electrical cable to power the pump assembly is either run along and secured to the outside of the spoolable tubing in the same way as with jointed tubing, or is supported within the spoolable tubing, as found with a tubing-encapsulated power cable.

These methods require a means of terminating and supporting the spoolable tubing or electro-mechanical cable at the well head, and also a means of routing the electrical cable through the well head.

General methods of terminating and supporting spoolable tubing and mechanical cable are well known, including (but not limited to) the use of wedge shaped slips, conical or seated tubing hangers, concentric cone rope sockets, swaged ferrules, spelter sockets, wedge sockets, collets etc.

As regards routing the electrical conductors through the well head, where an electrical cable is provided on the outside of spoolable tubing, the electrical cable can be routed in the same way as with jointed tubing. However, this method is rarely used because of its limited advantages over conventional jointed tubing. Where a tubing-encapsulated power cable or an electro-mechanical cable is used, two methods are known to have been used to date.

Firstly, the conical profile provided within the well head for suspending the production tubing string has been used with an adaptor to suspend the tubing-encapsulated power cable or electro-mechanical cable in the well. The electrical conductors are then routed through the centre of the well head and Christmas tree, exiting via a fluid to air connector above the Christmas tree valves. Alternatively, a hanger which includes a pressure containing chamber and a penetrator there-through is bolted to the top of the Christmas tree and the tubing-encapsulated power cable or electro-mechanical cable is suspended there from and thereby extends through the Christmas tree and well head. The electrical conductors extend through the penetrator. In all cases, the electrical conductor and in some cases the tubing encapsulation is routed through the Christmas tree valves, rendering it impossible to isolate the well directly above the well head flange using the lowest (master) valve on the Christmas tree. The ability to isolate the well for routine maintenance is severely restricted. Further, the entire Christmas tree above the well head flange is subject to well pressure, which increases the risk of a leak of well fluids. Further, the adaptor required to hang the tubing-encapsulated power cable or electro-mechanical cable from the conical profile provided within the well head to suspend the production tubing must be available in a wide variety of sizes/types. This is because there are a wide range of well heads so one adaptor would not be suitable for all types of well head. These adaptors are also normally bulky and heavy to accommodate the large difference in diameter between production tubing (which the conical profile is designed to fit) and tubing-encapsulated power cable or electro-mechanical cable. Accordingly, a large store of different adaptors is required to hang tubing-encapsulated power cable or electro-mechanical cable from a conical profile in a conventional well head.

The invention has been made with these points in mind.

SUMMARY OF THE INVENTION

According to the present invention, there is provided a load bearing assembly for suspending a load from a well head assembly. The well head assembly is of the type having a connector for suspending jointed production tubing therefrom and a fluid to air connector which can seal around an electrical conductor extending there-through. The load bearing assembly includes a first section comprising a portion of tubing which is provided with first connecting means for connecting the portion of tubing to the connector of the well head assembly, the load bearing assembly further comprising second connecting means for connecting the first section to a load bearing part of a second section suspended from the second connecting means for supporting a load in a well, the second section further comprising an electrical conductor part for supplying electrical power to the load and extending along the length of the load bearing part of the second section, the electrical conductor part being in electrical communication with an electrical cable which extends outside and at least part way along the first section away from the second connecting means and towards the well head in use.

The second section is preferably an electro-mechanical cable or a tubing-encapsulated power cable.

The present invention has the advantage that the assembly can be used with a conventional well head assembly. The load bearing assembly can be connected to the well head in exactly the same way as is widely used when currently deploying pump assemblies into well bores on the end of jointed tubing strings.

Further, no new, unproven method of routing the electrical cable from the well to the surface is required. The electrical cable can be routed from the well to the surface using a standard, industry-trusted penetrator or any other known fluid to air connector already used. Accordingly, the user can be reassured that the electrical cable need not extend through the Christmas tree, and can be confident of the integrity of the seal around the electrical cable.

In addition, the need for very many different types of assemblies to accommodate the different types of well heads and hangers manufactured is avoided. This is because the manufacturer's own tubing hangers can be used to hang the portion of tubing, and since only a relatively small number of tubing sizes are used, the second connecting means of the assembly of the invention can be available for only these few sizes.

The invention therefore allows loads, such as electric submersible pumps, to be deployed on a tubing-encapsulated power cable or an electro-mechanical cable without suffering from the above-described problems encountered with known systems. A jointed tubing deployed pumping assembly can therefore be changed to a tubing-encapsulated power cable or electro-mechanical cable deployed pumping assembly without affecting the function of the existing well head assembly.

In one embodiment, the electrical cable comprises a first portion which is integral with the electrical conductor part of the second section of the load bearing assembly and a second portion which is coupled to the first portion and which extends towards the fluid to air connector in use. The first, integral, portion of the electrical cable is therefore an extension of the electrical conductor part of the second section of the load bearing assembly, the extension extending beyond the top end of the load-bearing part of the second section.

In this way, the fluid to air connector, such as the penetrator, can be manufactured in a factory with an electrical conductor extending there-through as is current accepted practice, so that the seal provided by the fluid to air connector can be tested before use. The lower end of the electrical conductor extending through the fluid to air connector can then be coupled onto the electrical conductor running through the second section of the load bearing assembly, for example by splicing or by other techniques known to the skilled person for connecting electrical cables together. This has the advantage that currently available fluid to air connectors, particularly penetrators, can be used.

Alternatively, the electrical cable can be coupled to the electrical conductor part of the second section of the load bearing assembly at the second connecting means. In this case, the electrical conductor which extends through the fluid to air connector extends all the way down to the second connecting means and is therefore of a similar length to the first section of the load bearing assembly.

Advantageously, the electrical cable is secured to the first section of the load bearing assembly in at least one place part way along the length of the electrical cable so that the first section at least partially supports the weight of the electrical cable. Optionally, the electrical cable is secured to the first section of the load bearing assembly in multiple places along the length of the electrical cable. In this way, the electrical cable need not be under tension and need not even be capable of supporting its own weight.

The second section of the load bearing assembly may be an electro-mechanical cable. In this case, the electrical conductor part may comprise a conductive core and the load bearing part may comprise an outer load bearing sheath which surrounds the conductive core. The conductive core may include three conductive wires surrounded by an insulating material. The outer load bearing sheath can comprise spiral wound wires. Beneficially, there are two or more concentric layers of spiral wound wires. The different layers may be wound in opposite directions (contra-wound). Typically, the wires are steel armour wires.

The second section of the load bearing assembly may instead be a tubing-encapsulated power cable. The tubing-encapsulated power cable may be coiled tubing in which the electrical conductor part comprises a conductive core extending through and being separate from a length of spoolable tubing which is the load bearing part. The conductive core may, however, be coupled to the spoolable tubing, for example by clips. Alternatively, the tubing-encapsulated power cable can comprise an electrical core which has a tube surrounding it and bonded to it. In either case, the conductive core can comprise one or more conductive wires. For example, one or three conductive wires can be provided for single or three phase power supplies respectively, as will be appreciated by the skilled reader.

Preferably, the portion of tubing extends along the full length of the first section of the load bearing assembly and has a cylindrical side wall defining a channel having first and second open ends, the first end being the end provided with the first connecting means for connecting the portion of tubing to the connector of the well head assembly. For example, the first section can be in the form of a section of production tubing. This provides the advantage that sections of production tubing are readily available. Well fluids can therefore flow into the first section at the second open end (the lower end in use), up through the tubing, and out of the first open end (the upper end in use) of the first section at the well head. In some embodiments, the second open end is closed off and at least one opening is provided in the side wall of the portion of tubing. Said opening may be in the form of a plurality of perforations. The second open end can be closed off by the second connecting means or by a cap or plug. In this way, well fluids can flow into the portion of tubing through said opening in the side wall. This can reduce the fluid flow/turbulence around the second connecting means, which in turn can reduce wear such as abrasion on the second connecting means.

Alternatively, the first section of the load bearing assembly can further comprise a foot connected to the second open end of the portion of tubing. The foot can close off the second open end of the portion of tubing whilst extending the length of the first section beyond that of the portion of tubing. Again, at least one opening, such as a plurality of perforations, can be provided in the side wall of the portion of tubing, so as to allow well fluids to flow into the portion of tubing. In this way, the first section can comprise an upper end which looks like a section of production tubing so that it can be connected easily to a well head, but may comprise a lower end which can take a wider variety of forms. For example, the lower end, or foot, could be a solid block or rod which merely provides the first section of the load bearing assembly with a greater length than that provided by the upper end which reflects a section of production tubing.

Optionally, the first section of the load bearing assembly may comprise a second portion of tubing extending away from the second connecting means on the side of the second connecting means opposite the first portion of tubing, the second portion of tubing having a channel extending therethrough which is in communication with the channel extending through the first portion of tubing. This arrangement also enables the fluid to pass into the first portion of tubing without causing significant wear on the second connecting means. The second portion of tubing may be integral with the first portion of tubing or it may be connected to the second connecting means.

Alternatively, the second connecting means may be positioned at the lowest end of the first section of the load bearing assembly.

The second connecting means may be integral with the first section of the load bearing assembly and/or with the load bearing part of the second section of the load bearing assembly. Alternatively, the second connecting means can be releasably couplable to the first section of the load bearing assembly and to the load bearing part of the second section of the load bearing assembly. Where the second connecting means are releasably couplable, conventional production tubing, conventional tubing-encapsulated power cable or conventional electro-mechanical cable can be used. In this case, the second connecting means may comprise first coupling means for coupling the second connecting means to the first section of the load bearing assembly and second coupling means for coupling the second connecting means to the load bearing part of the second section of the load bearing assembly. The first coupling means may comprise threads for engaging corresponding threads provided on the first section of the load bearing assembly, though other means will be apparent to the skilled reader.

The second coupling means can comprise any suitable means known to the skilled reader. Where, the second section of the load bearing assembly is an electro-mechanical cable having a load bearing outer sheath, the second coupling means may comprise for example wedge shaped slips, concentric cone rope sockets, swaged ferrules, spelter sockets, wedge sockets etc. A concentric cone rope socket is generally preferred, and comprises a series of concentric conical surfaces between which the load bearing outer sheath is clamped.

Where the elongate suspension element is a tubing-encapsulated power cable, the second coupling means may comprise for example wedge shaped slips, conical or seated tubing hangers, collets or nuts engaged with the end of the tubing etc.

The first connecting means can comprise threads on the portion of tubing which can engage corresponding threads on the tubing hanger of the well head. However, other connectors suitable for connecting the portion of tubing to the well head will be known to the skilled person.

BRIEF DESCRIPTION OF THE DRAWINGS

The present invention will now be described, by way of example only, with reference to the accompanying Figures in which.

DETAILED DESCRIPTION OF PREFERRED EMBODIMENTS

Figure 2:
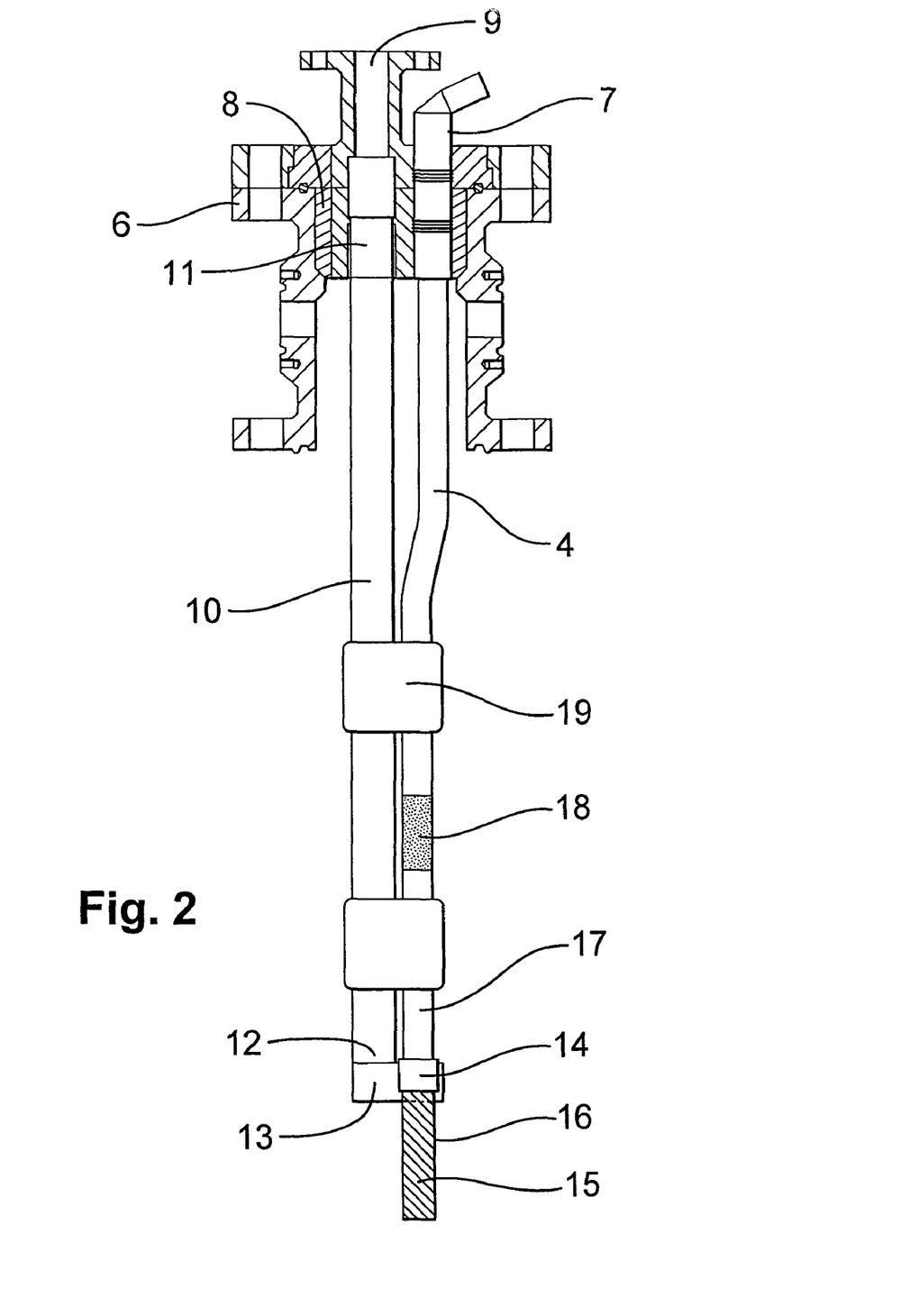
FIG. 2 is a schematic diagram of a load bearing assembly according to the present invention.

FIG. 2 shows a well head (6) from which the load bearing assembly of the present invention is suspended. The well head is of the conventional type used widely to suspend a jointed production tubing string in a well, and has a connector (8) to which the top end of the production tubing string connects, a passage (9) through which well fluids can flow and a penetrator (7) through which an electrical conductor (4) extends, the penetrator sealing around the electrical conductor and providing a seal between the well environment and the external environment. The penetrator is manufactured with the electrical conductor (4) extending there-through so that its lowest end can be spliced in situ onto an electrical conductor for powering down hole equipment.

The assembly of the present invention comprises a first section in the form of a portion of tubing (10) having a first end (11) and an opposing second end (12). The first end (11) is connected to the well head (6) using the well head's connector (8). The connector (8) is of the type described above with respect to FIG. 1. The opposing second end (12) is connected to a connector (13) by way of co-operating threads on the end (12) of the portion of tubing (10) and on the connector (13). More specifically, the end of the length of tubing is threaded and is screwed into a threaded recess (22) in the connector (13), as can be seen in detail in FIG. 3.

A second section of the load bearing assembly of the invention takes the form of an electro-mechanical cable (15). The electro-mechanical cable is connected to the connector (13) and is suspended there from. The electro-mechanical cable (15) extends down into the well and carries a pump assembly on its lowest end (not shown). The electro-mechanical cable (15) comprises a load bearing part (16) and an electric conducting part (17) (see also FIG. 3). The electric conducting part forms the core of the electro-mechanical cable and comprises one or more electrical wires surrounded by insulating material. The load bearing part (16) comprises a load bearing outer sheath in the form of two concentric layers (16a,16b) of contra-wound steel armour wires. Such electro-mechanical cables are well known in the art.

The load bearing outer sheath (16) is connected to the connector (13) by way of a concentric cone rope socket, which comprises a series of concentric cones (14), as will be discussed in more detail below in connection with FIG. 3.

Whereas the load bearing outer sheath (16) of the electro-mechanical cable (15) terminates at the connector (13), the electric conducting core (17) passes straight through the connector (13), extending beyond the end of the load bearing sheath (16) upwardly towards the well head. The electric conducting core (17) extends part way up the portion of tubing (10) and is then spliced (18) onto the electrical conductor (4) which extends through the penetrator (7).

The part of the electric conducting core (17) which extends beyond the end of the load-bearing outer sheath (16) (the exposed part) and the electrical conductor (4) which extends through the penetrator (7) are clamped onto the portion of tubing (10) by clamps (19) so that the weight of the exposed part of the electric conducting core (17) and the electrical conductor (4) is supported by the portion of tubing (10).

Figure 3:
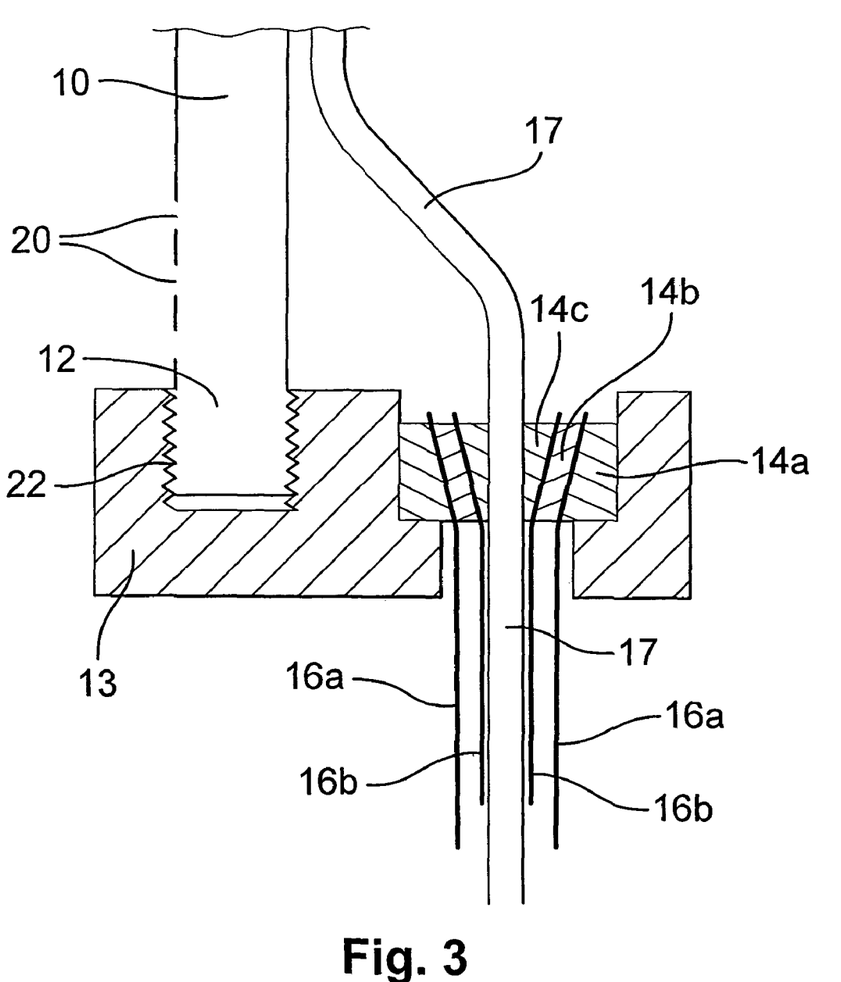
FIG. 3 is an enlarged section through the second connector of the load bearing assembly shown in FIG. 2.

The connection between the load bearing outer sheath (16) of the electro-mechanical cable (15) and the connector (13) can be seen in more detail in FIG. 3 The connector (13) comprises three cones (14a,14b,14c) which provide concentric conical surfaces between which the two concentric layers (16a,16b) of contra-wound steel armour wires of the load bearing outer sheath (16) are clamped, thereby securing the outer sheath (16) to the connector (13). This is sometimes known as a concentric cone rope socket. The connector (13), connected to the load bearing outer sheath (16) in this way, then sits in a recess in the connector (13) so as to hang the electro-mechanical cable (15) from the connector (13).

It can be seen that the electric conducting core (17) passes straight through the connector (13) and extends at least partially up the portion of tubing (10).

Although the opposing second end (12) of the portion of tubing (10) is open, the connector (13) closes off the open end (12) of the tubing when the tubing is screwed into the connector, as can be seen in FIG. 3. Perforations (20) are formed in the side wall of the tubing (10) so as to allow well fluids to flow into the tubing. The perforations (20) can be located at various points along the length of the portion of tubing (10).

Situating the fluid intake of the portion of tubing further from the connector (13) reduces abrasion of the connector (13) which can arise in embodiments where the connector does not close off the opposing second end (12). This is because, in those embodiments, fluid flows into the portion of tubing through its opposing second end (12), thereby creating a lot of turbulence around the connector (13). Particles such as sand in the fluid can abrade the connector (13).

In an alternative arrangement, the opposing second end (12) of the tubing could be permanently closed off, for example by a cap on the end of the tubing or by forming the opposing second end as a solid foot. In the latter case, the perforations (20) are arranged above the solid foot.

Figure 4:
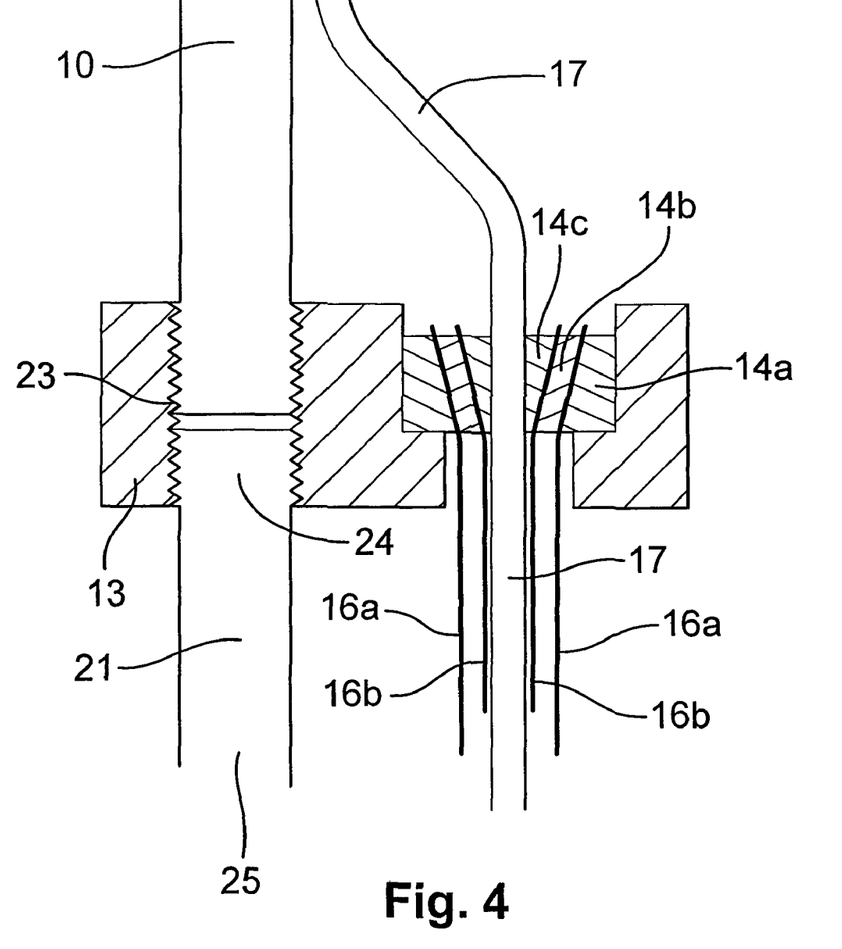
FIG. 4 is an enlarged section through a second connector according to another embodiment of the invention.

FIG. 4 shows a further embodiment of the invention which is similar to that shown in FIGS. 3 and 4 and described above. Like reference numerals refer to like features. In this embodiment, the connector (13) is formed with a threaded bore (23) there-through. The portion of tubing (10) is screwed into the bore (23) to connect the portion of tubing to the connector. In addition, a second portion of tubing (21) is connected to the connector (13) by way of threads on the outer surface of its upper end (24). The channel extending through the second portion of tubing (21) is therefore in communication with the channel extending through the first portion of tubing (10). Well fluids can enter the second portion of tubing (21) through its open lower end (25) and pass from the second portion (21) of tubing to the first portion of tubing (10) and therefore out of the well.

This is another way of situating the fluid intake for the portion of tubing further from the connector (13), and thereby avoids undue abrasion of the connector.

In another embodiment of the invention, tubing-encapsulated power cable is used to suspend a pump assembly in the well. In this case, the load bearing assembly of the invention is generally as described above except that the connector (13) is provided with means to connect the load bearing tubing of the tubing encapsulated power cable to the connector. The tubing-encapsulated power cable therefore hangs from the connector (13) in a similar manner as described above with respect to the electro-mechanical cable (15). The electrical conducting part of the tubing-encapsulated power cable also extends continuously through the connector; beyond the end of the load bearing tubing and upwards towards the well head, as described above with respect to the electric conducting core (17).

Other variations to the above-described examples may be apparent to the skilled reader. For example, the electric conducting core (17) of the electro-mechanical cable or of the tubing-encapsulated power cable may terminate at the connector (13) and the electrical conductor (4) which extends through the penetrator (7) may extend down to the connector (13). In this case, the electric conducting core (17) may be coupled to the electrical conductor (4) at the connector (13). Alternatively, the electric conducting core (17) may be integral with the electrical conductor (4) extending through the penetrator (7).

The invention claimed is:

1. A load bearing assembly for suspending a load from a well head assembly, the well head assembly being of the type having a connector for suspending jointed production tubing therefrom and a fluid to air connector which can seal around an electrical conductor extending there-through, wherein the load bearing assembly comprises a jointed production tubing section comprising a portion of tubing which is provided with first connecting means for connecting the portion of tubing to the connector of the well head assembly, the load bearing assembly further comprising second connecting means for connecting the jointed production tubing section to a load bearing part of an electrical conduction section of the load bearing assembly wherein the load bearing part suspends the weight of the electrical conduction section and a load in a well from the second connecting means, the electrical conduction section further comprising an electrical conductor part for supplying electrical power to the load and extending along the length of the load bearing part of the electrical conduction section, the electrical conductor part being in electrical communication with an electrical cable which extends outside and at least part way along the jointed production tubing section away from the second connecting means and towards the well head in use.

2. An assembly as claimed in claim 1, wherein the electrical cable comprises a first portion which is integral with the electrical conductor part of the electrical conduction section of the load bearing assembly and a second portion which is coupled to the first portion and which extends towards the fluid to air connector in use.

3. An assembly as claimed in claim 1, wherein the electrical cable is coupled to the electrical conductor part of the electrical conduction section of the load bearing assembly at the second connecting means.

4. An assembly as claimed in claim 1, in which the electrical cable is secured to the jointed production tubing section of the load bearing assembly in at least one place along the length of the electrical cable so that the jointed production tubing section at least partially supports the weight of the electrical cable.

5. An assembly as claimed in claim 1, wherein the electrical conduction section of the load bearing assembly is an electro-mechanical cable, the electrical conductor part of which comprises a conductive core and the load bearing part of which comprises an outer load bearing sheath which surrounds the conductive core.

6. An assembly as claimed in claim 5, in which the second connecting means comprises a series of concentric conical surfaces between which the outer load bearing sheath is clamped.

7. An assembly as claimed in claim 6, wherein the series of concentric conical surfaces comprises three cones between which two concentric layers of the load bearing outer sheath are clamped thereby securing the outer sheath to the second connecting means.

8. An assembly as claimed in claim 1, wherein the electrical conduction section of the load bearing assembly is a tubing-encapsulated power cable of the type in which (a) a conductive core extends through and is separate from a length of spoolable tubing, or (b) an electrical core has a tube surrounding it and bonded to it.

9. An assembly as claimed in claim 1, in which the portion of tubing extends along the full length of the jointed production tubing section of the load bearing assembly and has a cylindrical side wall defining a channel having first and second open ends, the first end being the end provided with the first connecting means for connecting the portion of tubing to the connector of the well head assembly.

10. An assembly as claimed in claim 9, in which the second open end is closed off and at least one opening is provided in the side wall of the portion of tubing.

11. An assembly as claimed in claim 10, wherein the second connecting means is located at the second open end of the portion of tubing.

12. An assembly as claimed in claim 9, wherein the second connecting means is located at the second open end of the portion of tubing.

13. An assembly as claimed in claim 9, wherein the jointed production tubing section of the load bearing assembly further comprises a second portion of tubing extending away from the second connecting means on the side of the second connecting means opposite the first portion of tubing, the second portion of tubing having channel there-through which is in communication with a channel extending through the first portion of tubing.

14. An assembly as claimed in claim 1, in which the portion of tubing has a cylindrical side wall defining a channel having first and second open ends, the first end being the end provided with the first connecting means for connecting the portion of tubing to the connector of the well head assembly and wherein at least one opening is provided in the sidewall of the portion of tubing, the jointed production tubing section further comprising a foot connected to the second open end of the portion of tubing to close off the second open end whilst extending the length of the jointed production tubing section beyond that of the portion of tubing.

15. An assembly as claimed in claim 1, in which the second connecting means is releasably couplable to the jointed production tubing section of the load bearing assembly and to the load bearing part of the electrical conduction section of the load bearing assembly.

16. An assembly as claimed in claim 1, in which the second connecting means is integrally formed with the jointed production tubing section of the load bearing assembly.

17. An assembly as claimed in claim 1, wherein the electrical conduction section of the load bearing assembly carries a pump assembly at its lowest end.

18. An assembly as claimed in claim 1, wherein the fluid to air connector is a penetrator.

* * * * *